(12) United States Patent
Lewis, II et al.

(10) Patent No.: US 8,655,960 B2
(45) Date of Patent: Feb. 18, 2014

(54) LOCATION-AWARE INSTANT MESSAGING

(75) Inventors: Joseph Barry Lewis, II, Morris Plains, NJ (US); Biren Patel, San Ramon, CA (US); Sanjeevan Sivalingham, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 12/142,207

(22) Filed: Jun. 19, 2008

(65) Prior Publication Data

US 2009/0319616 A1  Dec. 24, 2009

(51) Int. Cl.
*G06F 15/16* (2006.01)

(52) U.S. Cl.
USPC ............... 709/206; 709/217; 709/250; 726/1; 726/26

(58) Field of Classification Search
USPC .................. 709/206, 217, 250; 726/1, 26
See application file for complete search history.

(56) References Cited

U.S. PATENT DOCUMENTS

| | | | | |
|---|---|---|---|---|
| 5,555,376 A | * | 9/1996 | Theimer et al. | 709/229 |
| 5,897,635 A | * | 4/1999 | Torres et al. | 1/1 |
| 5,938,721 A | * | 8/1999 | Dussell et al. | 701/468 |
| 6,044,395 A | * | 3/2000 | Costales et al. | 709/206 |
| 6,320,534 B1 | * | 11/2001 | Goss | 342/357.29 |
| 6,351,771 B1 | * | 2/2002 | Craddock et al. | 709/227 |
| 6,430,602 B1 | * | 8/2002 | Kay et al. | 709/206 |
| 6,446,004 B1 | * | 9/2002 | Cao et al. | 701/482 |
| 6,484,033 B2 | * | 11/2002 | Murray | 455/456.3 |
| 6,505,048 B1 | * | 1/2003 | Moles et al. | 455/456.1 |
| 6,526,352 B1 | * | 2/2003 | Breed et al. | 701/213 |
| 6,560,530 B1 | * | 5/2003 | Yamada et al. | 701/532 |
| 6,594,483 B2 | * | 7/2003 | Nykanen et al. | 455/411 |
| 6,650,902 B1 | * | 11/2003 | Richton | 455/456.3 |
| 6,668,173 B2 | * | 12/2003 | Greene | 455/445 |
| 6,678,613 B2 | * | 1/2004 | Andrews et al. | 701/468 |
| 6,798,755 B2 | * | 9/2004 | Lillie et al. | 370/312 |
| 7,092,498 B2 | * | 8/2006 | Hariri et al. | 379/93.01 |
| 7,136,919 B1 | * | 11/2006 | Foncarnier | 709/224 |
| 7,139,820 B1 | * | 11/2006 | O'Toole et al. | 709/223 |
| 7,433,680 B2 | * | 10/2008 | Jenkins et al. | 455/412.1 |
| 7,447,165 B1 | * | 11/2008 | Sylvain | 370/254 |

(Continued)

FOREIGN PATENT DOCUMENTS

CN  101127735  2/2008

OTHER PUBLICATIONS

Solanas et al.; Location Privacy in Loation-based services: Beyond TTP-based Schemes; PiLBA'08 Proceeedings; pp. 12-23.*

(Continued)

*Primary Examiner* — Krista Zele
*Assistant Examiner* — Anthony Fabbri

(57) ABSTRACT

A method includes receiving, at a carrier network provider, a request from a requestor's mobile device to locate an instant messaging (IM) friend from the requestor's IM friends list; authenticating the request for use of location-based services on the carrier network; receiving geographic location coordinates from the requestor's mobile device; adding random error to the geographic location coordinates; sending the request to locate an IM friend and the geographic location coordinates with random error to an IM portal; receiving a list of the requestor's IM friends within a particular region near the geographic location coordinates with random error; and sending to the requestor's mobile device the list of IM friends within the particular region near the geographic location coordinates with random error.

20 Claims, 7 Drawing Sheets

(56) References Cited

U.S. PATENT DOCUMENTS

| | | | |
|---|---|---|---|
| 7,689,524 B2* | 3/2010 | Ozzie et al. ................. 706/45 |
| 7,809,805 B2* | 10/2010 | Stremel et al. ................ 709/219 |
| 2002/0075305 A1* | 6/2002 | Beaton et al. ................. 345/751 |
| 2002/0183077 A1* | 12/2002 | Fomukong ................... 455/456 |
| 2003/0143994 A1* | 7/2003 | Kimura et al. ................ 455/422 |
| 2003/0153310 A1* | 8/2003 | Ishii .............................. 455/435 |
| 2003/0219104 A1* | 11/2003 | Malik ........................ 379/88.11 |
| 2003/0224762 A1* | 12/2003 | Lau et al. ................... 455/412.2 |
| 2003/0225589 A1* | 12/2003 | Eaton et al. ....................... 705/1 |
| 2004/0176103 A1 | 9/2004 | Trossen et al. |
| 2004/0203902 A1 | 10/2004 | Wilson et al. |
| 2005/0182816 A1* | 8/2005 | Lin et al. ....................... 709/200 |
| 2005/0273493 A1* | 12/2005 | Buford et al. .................. 709/204 |
| 2006/0161599 A1* | 7/2006 | Rosen ............................ 707/201 |
| 2006/0258371 A1* | 11/2006 | Krishnamurthi et al. .. 455/456.1 |
| 2006/0267836 A1* | 11/2006 | Bird .......................... 342/357.06 |
| 2007/0149213 A1 | 6/2007 | Lamba et al. |
| 2007/0192299 A1* | 8/2007 | Zuckerberg et al. ............. 707/3 |
| 2009/0164639 A1* | 6/2009 | Sylvain ......................... 709/227 |
| 2009/0167554 A1* | 7/2009 | Munje et al. ............. 340/825.49 |
| 2009/0265781 A1* | 10/2009 | Prehofer et al. ................. 726/22 |
| 2010/0152949 A1* | 6/2010 | Nunan et al. ................... 701/29 |
| 2010/0231526 A1* | 9/2010 | Kawabata ..................... 345/173 |
| 2010/0295726 A1* | 11/2010 | Tann ........................ 342/357.24 |
| 2010/0332668 A1* | 12/2010 | Shah et al. .................... 709/229 |

OTHER PUBLICATIONS

Mokbel et al. The New Casper: Query Processing for Location Services without Compromising Privacy; 2006; In Proc. of the 32nd International Conference on Very Large Data Bases, VLDB; pp. 763-774.*

Escudero-Pascual, A.; Maguire, G.Q., Jr.; Role(s) of a Prxy in Location-based Services; 2002; IEEE, The 13th IEEE International Symposium on Personal, Indoor and Mobile Radio Communications, 2002; vol. 3; pp. 1252-1256.*

Xiao, Zhen, et al., "Quality Aware Privacy Protection for Location-Based Services", DASFAA 2007, LNCS 4443, pp. 434-448, Dec. 31, 2007.

* cited by examiner

LOCATION-AWARE INSTANT MESSAGING

BACKGROUND INFORMATION

Instant messaging (IM) and chat technologies facilitate near real-time text-based communication between two or more participants over a network. Mobile instant messaging (MIM) may transpose the desktop IM experience to practically orient IM for mobile communications. IM and MIM may utilize a friend-to-friend network. A friend may advise others of their location using text inputs (e.g., "I am at home"), but automated location indicators for IM and MIM environments have not been successfully integrated.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide secure, authorized systems and/or methods for a requesting subscriber of an instant messaging (IM) network to be conveniently notified of the geographic location of an IM "friend." In one implementation, the requesting subscriber may request the approximate location of a particular "friend" on their IM friend list by selecting a "find this friend" feature on the IM user interface of the requesting subscriber's mobile device. In another implementation, the requesting subscriber may request the approximate location of any nearby "friend" on their IM friend list by selecting a "find nearby friend" feature on the IM user interface of the requesting subscriber's mobile device. Selecting either "find" feature may cause the mobile device to communicate with a location proxy server (LPS) to determine the current location of the requesting subscriber's mobile device. The mobile device may communicate its location information to an IM infrastructure. The IM infrastructure may provide geographic location information based on the location of the requesting subscriber or based on the particular friend selected by the requesting subscriber. The IM infrastructure may add random error information to a latitude and/or longitude associated with the requested geographic location for security purposes.

The term "instant messaging (IM)" may refer to real-time or near real-time communication between two or more people based on typed text that may be conveyed via computing devices over a network. As used herein, the term "subscriber" may include a registered user of an IM service, where a "requesting subscriber" or "requestor" may include a subscriber initiating a request to locate a friend and a "target subscriber" or "target" may include a subscriber whose location is being requested. A "requesting device" may include a communications device used by a requesting subscriber, while a "target device" may be a communications device used by a target subscriber. As used herein, the terms "IM friend" and "friend" may refer to one or more a subscribers that have agreed to accept IM communications from another subscriber. As used herein, the terms "friend," "subscriber," "requesting subscriber," "target subscriber" and/or "user" may be broadly interpreted to include a device (such as a fixed or mobile communications device) and/or a user of a device.

Figure 1:
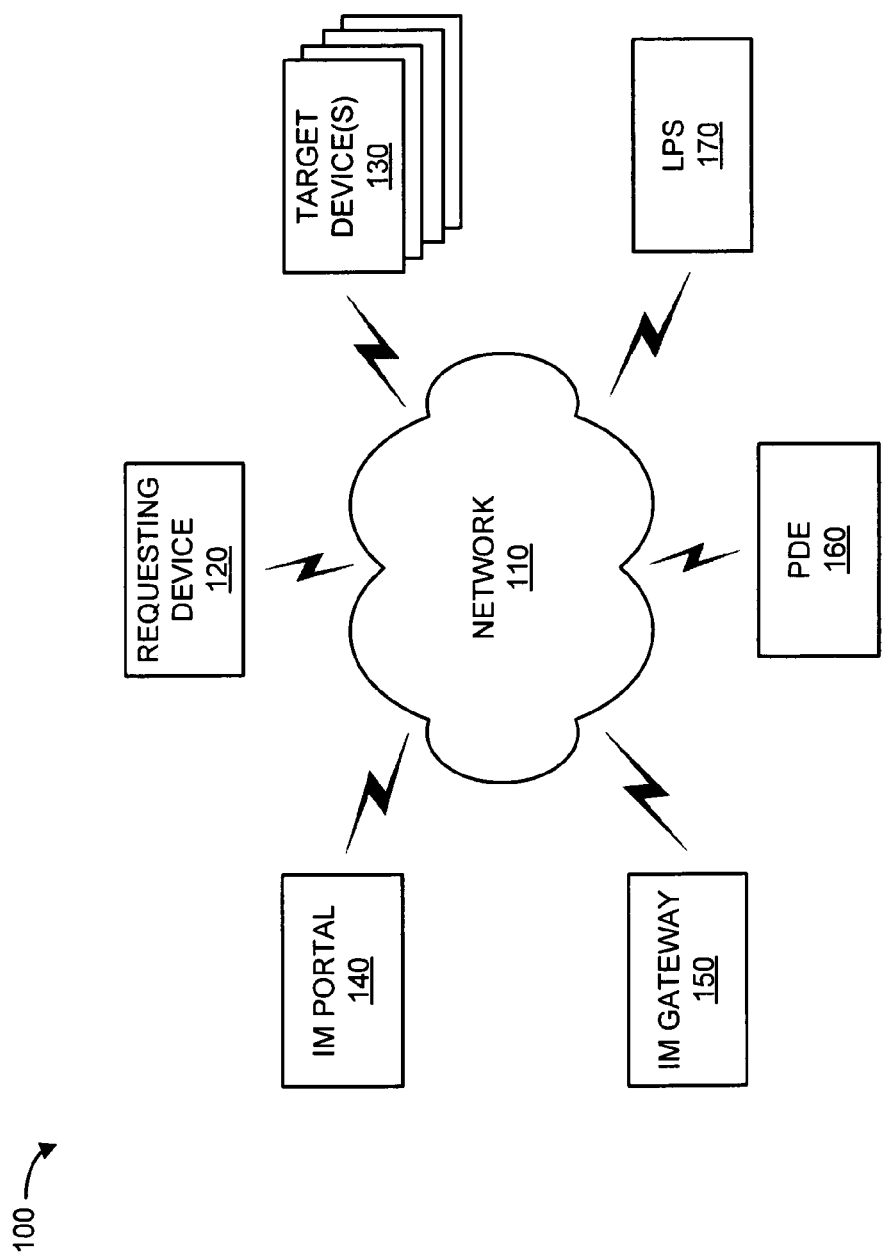
FIG. 1 depicts an exemplary network in which systems and methods described herein may be implemented.

FIG. 1 depicts an exemplary system 100 in which concepts described herein may be implemented. As illustrated, system 100 may include a requesting device 120, one or more target devices 130, an IM portal 140, an IM gateway 150, an position determining entity (PDE) 160 and/or a location proxy server (LPS) 170 interconnected by a network 110. Requesting device 120, target devices 130, IM portal 140, IM gateway 150, PDE 160 and/or LPS 170 may connect to one or more network 110 via wired and/or wireless connections. One requesting device, several target devices, one IM portal, one IM gateway, one PDE, one LPS, and one network have been illustrated in FIG. 1 for simplicity. In practice, there may be more or fewer requesting devices, target devices, IM portals, IM gateways, PDEs, LPSs, and/or networks. Also, in some instances, one or more of requesting device 120, target devices 130, IM portal 140, IM gateway 150, PDE 160 and/or LPS 170 may perform one or more functions described as being performed by another one or more of requesting device 120, target devices 130, IM portal 140, IM gateway 150, PDE 160 and/or LPS 170.

Network 110 may include one or more networks including a cellular network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 110 may include a combination of networks including a cellular network that uses components for transmitting data to and from requesting device 120, target devices 130 and IM portal 140, IM gateway 150, PDE 160 and/or LPS 170. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Requesting devices 120 and target devices 130 may each include any type of conventional device that is able to communicate via a network. For example, requesting devices 120 and target devices 130 may include any type of device that is capable of transmitting and receiving data (e.g., voice, text, images, multi-media data) to/from network 110. In an exemplary implementation, one or both of requesting devices 120 and target devices 130 may include a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a portable game and/or music playing device; and/or a conventional laptop and/or palmtop receiver or other appliance that includes a radiotelephone transceiver. Mobile terminals may also be referred to as "pervasive computing" devices. In another exemplary implementation, one or more of requesting devices 120 and target devices 130 may include a desktop computer or other fixed-location computing device.

IM portal 140 may include one or more entities that gather, process, search, and/or provide information in a manner described herein. For example, in one implementation, IM portal 140 may provide access to an IM service provider that facilitates IM services over a proprietary interface and/or protocol. IM portal may include a variety of infrastructure components to store and disseminate information regarding subscribers of the IM service, including, for example, databases and servers that support location management services.

IM gateway 150 may include a data transfer device, such as a gateway, a router, a switch, a firewall, a bridge, a proxy server, a server, a device providing domestic switching capabilities, or some other type of device that processes and/or transfers data. In one implementation, IM gateway 150 may operate on data on behalf of a network (e.g., a mobile carrier network) and may serve as an entrance to another network (e.g., an IM portal network).

PDE 160 may include one or more entities that gather, process, search, and/or provide information in a manner described herein. For example, PDE 160 may include one or more components to determine the position of a mobile terminal (e.g., requestor device 120 or one of target devices 130) and/or to help a mobile terminal determine its own position. The PDE may, for example, track the position of global positioning system (GPS) satellites through a network of stationary GPS receivers distributed across the coverage area of a wireless network. The PDE may determine an approximate location of a mobile terminal based on the signal from a local base station and provide the mobile terminal with the identities and positions of GPS satellites that are likely to be in range of the mobile terminal. PDE 160 may support one or more position determining technologies or algorithms to gather location information.

LPS 170 may collect and provide real-time (or near real-time) location information for requesting device 120 and target devices 130. LPS 170 may provide privacy management and control, as well as a platform for common geo-services and geo-data.

Figure 2:
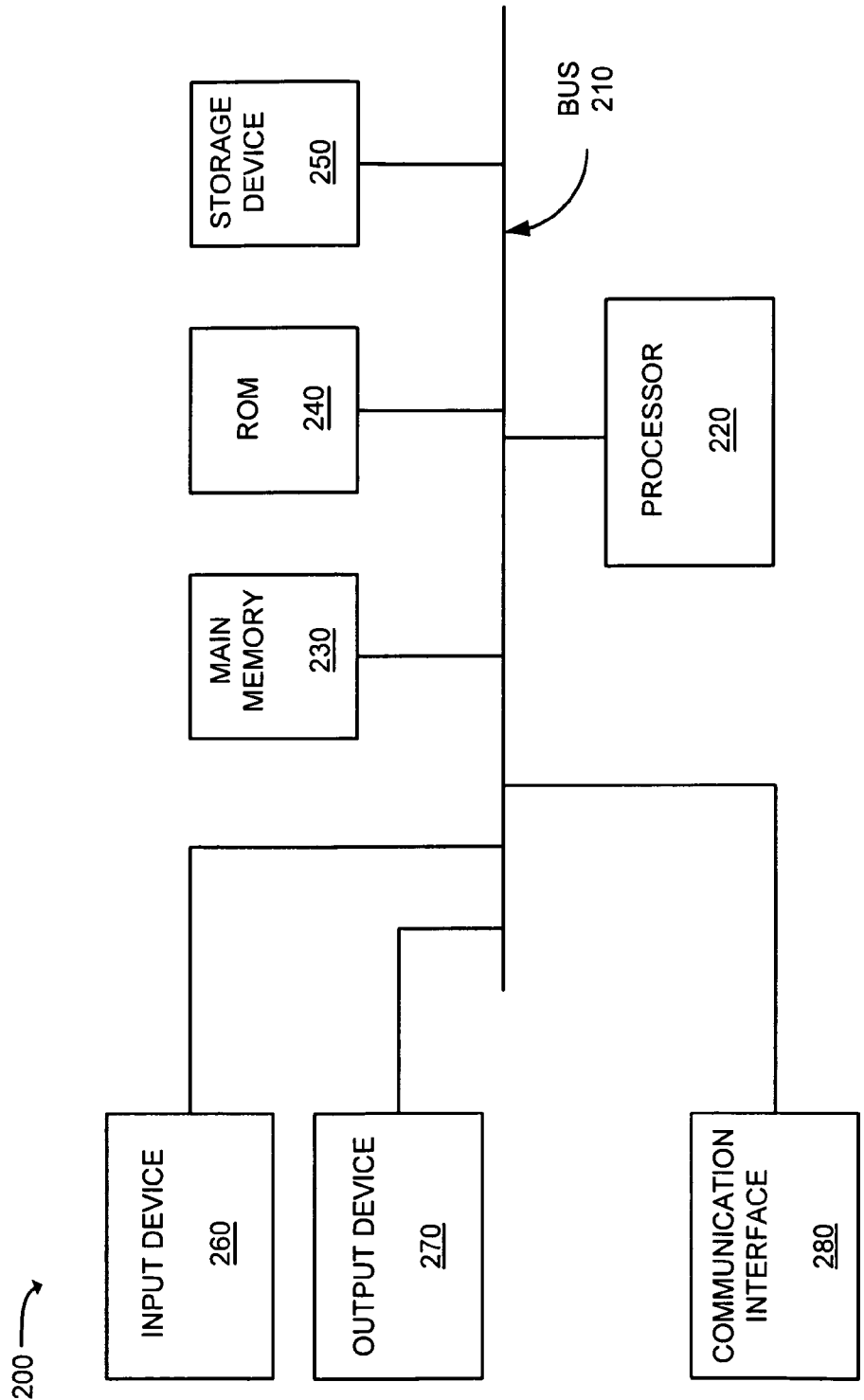
FIG. 2 is a diagram of an exemplary device that may be used in the systems of FIG. 1.

FIG. 2 is an exemplary diagram of a device 200 that may correspond to any of requesting device 120 and target devices 130, IM gateway 150, PDE 160 and/or LPS 170. As illustrated, device 200 may include a bus 210, a processor 220, a main memory 230, a read only memory (ROM) 240, a storage device 250, an input device 260, an output device 270, and a communication interface 280. Bus 210 may include conductors or a pathway that permit communication among the components of device 200.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to device 200, such as a keyboard, a touch screen, a touch pad, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 110.

As described herein, device 200 may perform certain operations in response to processor 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer or additional components that may compliment and enable an emergency forking/notification service. In still other implementations, one or more components of device 200 may perform the tasks performed by other components of device 200.

Figure 3:
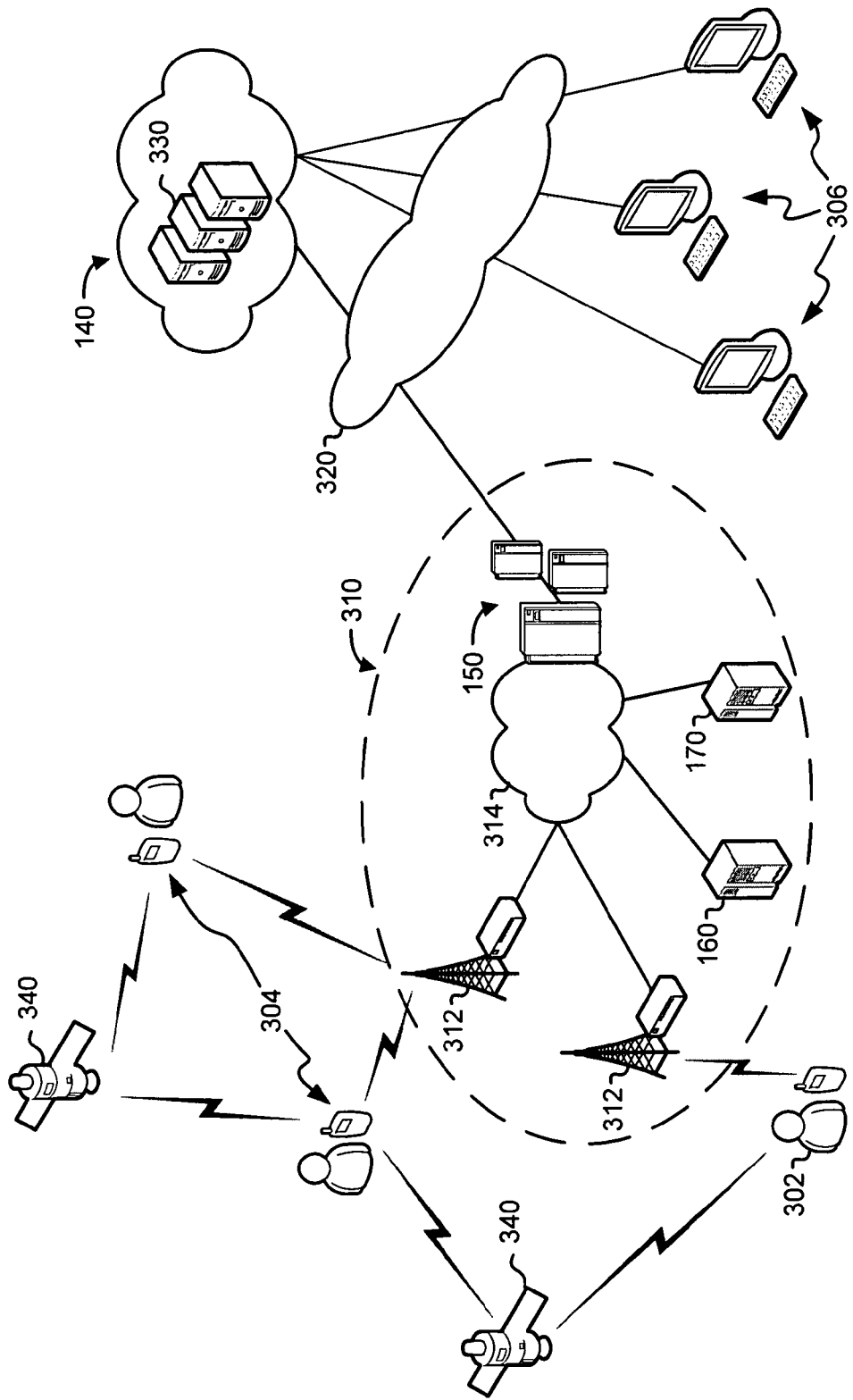
FIG. 3 is an exemplary functional diagram conceptually illustrating an implementation of location-aware IM service.

FIG. 3 is an exemplary functional diagram conceptually illustrating an implementation of location-aware IM service. As shown in FIG. 3, a requester 302 (e.g., via a mobile device), mobile targets 304, and fixed-location targets 306 may be connected by a carrier network 310, IM portal 140, and the Internet 320. Each of requester 302, mobile targets 304, and fixed-location targets 306 may be subscribers to a location-aware IM service.

Carrier network 310 may include one or more radio access networks 312, IM gateway 150, PDE 160 and LPS 170 connected with a core carrier infrastructure 314. Radio access networks 312 may include a variety of components to facilitate mobile communications, such as antennas, base transceiver stations, mobile switching centers, and interfaces with PSTNs and/or packet data servicing nodes (PDSNs). IM portal 140 may include components necessary to facilitate IM traffic, including for example, one or more load balancers, gateways, and databases connected by a core IM infrastructure (not shown). IM portal 140 may also include one or more location management servers 330 to manage location-based data of, for example, subscribers to a location-aware IM service.

Requestor 302 may submit a request to locate one or more IM friends (e.g., a device of another IM subscriber, such as one of mobile targets 304 and/or fixed-location targets 306). Requestor 302 and mobile targets 304 may communicate with carrier network 310 (and more specifically with location-based service infrastructure within carrier network 310, such as PDE 160 and LPS 170) and global positioning system (GPS) satellites 340 to determine a geographic location of each subscriber's mobile device. Also, requester 302, mobile targets 304, and fixed-location targets 306 may communicate with IM portal 140 to provide location information and to deliver instant messages.

Location information from each of requester 302, mobile targets 304, and fixed-location targets 306 may be stored in a memory or database operatively connected with location management servers 330. In some implementations, location information may include, for example, GPS information or another form of global navigation satellite system (GNSS) information collected from a mobile communications device. In other implementations, location information may be in the form of cellular tower triangulation information collected from a mobile communications device. In still other implementations, location information may be in the form of a fixed address or location associated with a wired network connection or IP address. Location information for fixed-location devices may be provided by subscribers, for example, at the time of registering for the location-aware IM service.

Although the configuration of FIG. 3 shows exemplary components, in other implementations, fewer or additional components may be used. In other implementations, features of certain components may be combined. For example, in one implementation, one or more functions of PDE 160 and LPS 170 may be combined. Conversely, a single component may be implemented as multiple, distributed components. For example, IM gateway 150 may be a distributed component. Further, connections between the various components may be directly made or may be indirectly made via a node, a network, or a combination thereof.

Figure 4:
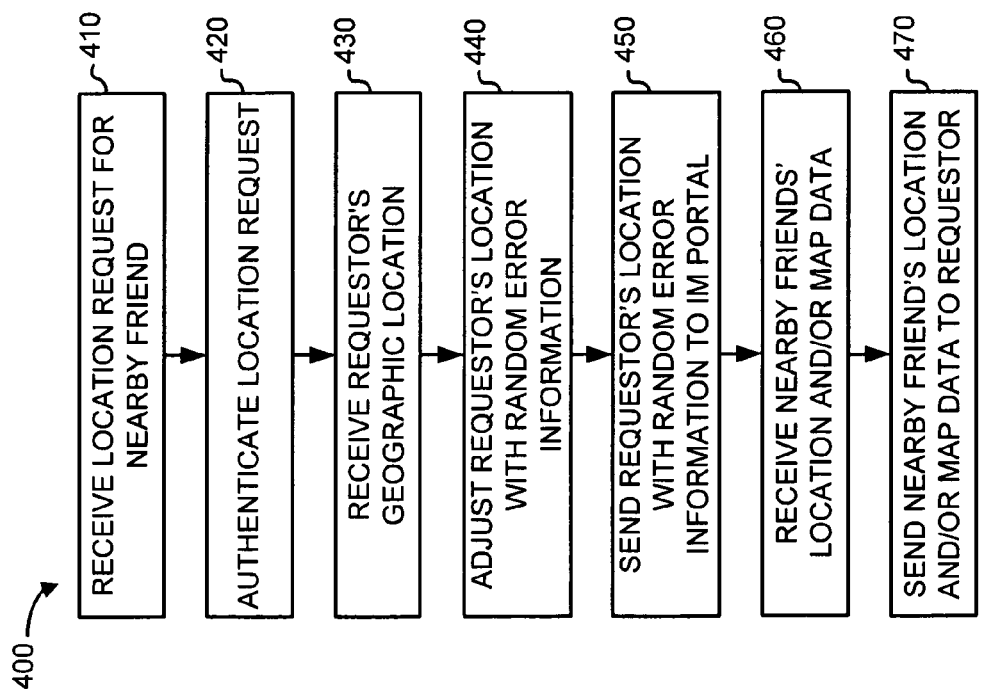
FIG. 4 is a flow chart illustrating exemplary operations that may be performed by a carrier network provider in a system offering location-aware IM service.

FIG. 4 provides a flow chart 400 illustrating exemplary operations that may be performed by a carrier network provider when a request to locate an IM friend is provided to a system offering location-aware IM services. The operations may be performed by components of a carrier network, such as carrier network 310, in conjunction with an IM provider, such as IM portal 140.

As shown in FIG. 4, a location request for a nearby friend may be received (block 410). For example, a base station may receive a request to locate a friend from a subscriber's IM friends list. The location request may be for a particular friend (e.g., a single friend selected from the friend list) or any friend(s) within a particular area (e.g., a "nearby friend"). The request for a nearby friend may be generated by an IM subscriber, such as a mobile device user or a user of a fixed-location device. The requester may establish parameters of what constitutes a "nearby" friend prior to providing the request. For example, in one implementation, a requester may program into the requesting device a parameter of a one-half-kilometer radius of the requestor's location. In another implementation, a default parameter for "nearby" may be included in the requesting device software.

The location request may be authenticated (block 420). For example, the requestor's location request may be delivered to location proxy server 170 to make sure that the requestor making the request is an authorized user and that the request is coming from a valid Internet protocol (IP) address. LPS 170 may communicate with another carrier network component, such as an authentication, authorization, and accounting (AAA) server to authenticate the location request.

The geographic location of the requestor may be received (block 430). For example, the geographic location of the requestor may be provided from the requestor's mobile device to the IM gateway (such as IM gateway 150) of the carrier network. The geographic location of the requestor may be determined by, for example, a GPS system, tower triangulation techniques, manual association of the requesting device with a known geographic location, or other location-determining techniques. In one implementation, PDE 160 may assist the requesting device in determining its GPS coordinates by providing ephemeris data to the requesting device to allow faster identification of satellites within view of the requesting device.

The requestor's location may be adjusted with random error information (block 440). For example, the IM gateway (such as IM gateway 150) of the carrier network may add random error information to the latitude and longitude of the requestor's GPS coordinates (e.g., between 10 and 500 meters) for security/privacy purposes. The value of the error information (e.g., the distance between a user's actual location and the published location) may be limited within some configurable maximum limit. In some implementations, the error may be specific to each user. Thus, it would not be possible to determine error used by a carrier network for one subscriber based on random error used by that carrier network for another subscriber. In another implementation, the same error information should be applied to a subscriber's location when the subscriber is in the same general area. Any variations in error information with respect to a subscriber's location or time may occur gradually. Consistency in error information for the same location may prevent multiple data points being used to "zero in" on a subscriber's actual location over time. The error information applied at two points is uncorrelated when those points are separated by at least a configurable distance. This would make it difficult to use the error applied by the carrier at one location (e.g. a public location) to determine a subscriber's actual co-ordinates when the subscriber is at a different location (e.g a private location) so long as those locations are separated by at least the configurable distance.

The requestor's geographic location may be adjusted with random error information using a variety of techniques and/or algorithms. In one implementation, random error may be added by rounding off more precise location coordinates to a default set of coordinates for a defined region. For example, the surface of the earth may be divided into grid lines of latitude and longitude lines. The spacing between the grid lines (and, thus, the size of cells defined by the grid lines) may be determined based on, for example, a configurable maximum error limit. Any time the requestor's location may be identified anywhere within a particular cell, the actual coordinates could be altered to a particular set (e.g., a default set) of location coordinates for that cell.

In another implementation, random error may be added as an error function varying with location. For example, the surface of earth may be divided by into a series of points on latitude lines. Spacing between the latitude lines and between consecutive points on each latitude line may be determined based on distance over which the error function should be correlated. A random error vector that includes a maximum displacement and a direction may be associated with each point. The random error associated with a point may diminish (e.g., exponentially decrease) as the distance between the point and user's actual location increases. The random error vector components (displacement and direction) for each point may be independent of vector components for other points and independent for each user. The displacement component may be a random number between 0 and configurable maximum error limit, while the direction component may be a random number between 0 and 360 degrees. For any of the requestor's actual location coordinates, generally a few points on one or more of the latitude lines will be within the correlation distance (e.g., two points on a latitude line above the actual location and two points on a latitude line below the actual location). The random error to be applied to the requestor's actual location may be calculated by adding the random error vectors associated with the few points within the correlation distance.

In one implementation, random error information added to a latitude coordinate may be calculated differently from random error information added to a longitude coordinate. In another implementation, random error information added to a distance value may be calculated differently from random error information added to a directional value. In another implementation, random error information can be added to location coordinates by the requesting device, prior to providing the coordinates to the IM gateway.

Continuing with FIG. 4, the requestor's location with the random error information may be sent to an IM portal (block 450). For example, the IM gateway may send the randomly-altered latitude and longitude coordinates to the IM portal. The IM portal may use the randomly-altered latitude and longitude coordinates, along with the requestor's parameters, to identify the location and/or map data of nearby friends and send that information back to the carrier network. Aspects identifying nearby friends are described in more detail with respect to FIG. 5.

The nearby friends' location and/or map data may be received (block 460). For example, IM gateway may receive a list of friends within the requestor's defined radius of the requestor's randomly-altered latitude and longitude coordinates. The nearby friends list may include a variety of location information, depending on what may be available to the IM portal. For example, the information may include descriptive location data (e.g., "I'm at home" or "Bob's Pizza Palace") and/or particular latitude and longitude coordinates. Finally, the nearby friends' location and/or map data may be sent to the requester (block 470).

Figure 5:
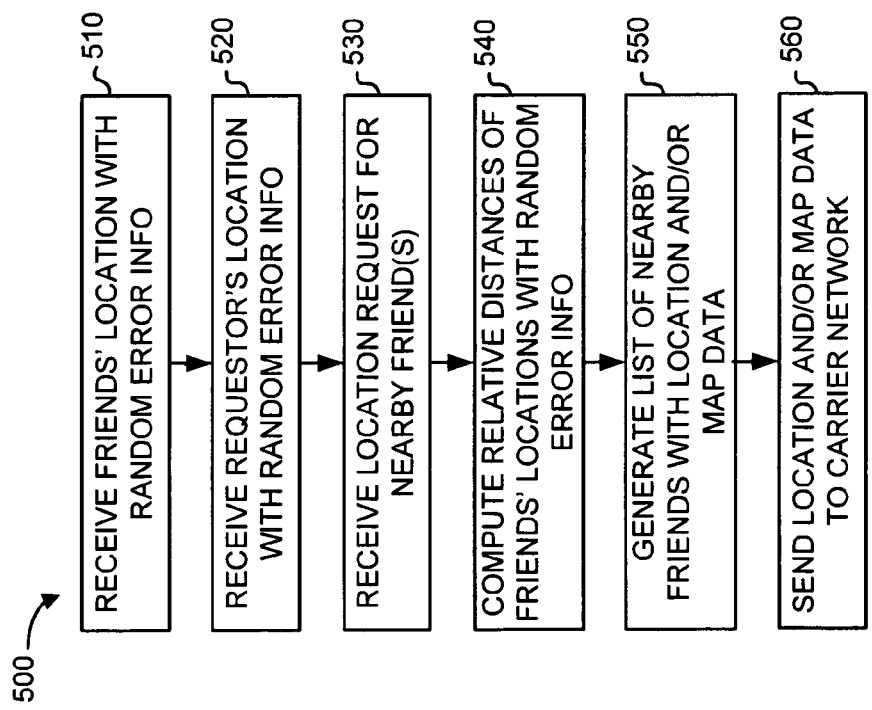
FIG. 5 is a flow chart illustrating exemplary operations that may be performed by an IM portal in a system offering location-aware IM service.

FIG. 5 provides a flow chart 500 illustrating exemplary operations that may be performed by an IM provider when a request to locate an IM friend is provided to a system offering location-aware IM services. The operations may be performed by components of an IM portal, such as IM portal 140, in conjunction with a wireless carrier network, such as carrier network 310.

As shown in FIG. 5, friends' location information with random error information may be received (block 510). For example, the IM portal may receive location information from other IM subscribers who use a mobile carrier network. At least some of these IM subscribers may be a friend of a particular requestor, such as requestor 302 of FIG. 3. Location data for IM subscribers who use a mobile carrier network may be randomly-altered prior to being received by the IM portal in a manner similar to that described above with respect to the requestor's location data (block 440 of FIG. 4). The location data for IM subscribers who use a mobile carrier network may be combined with other location data that may be available from fixed-device users and/or manually provided information. The location information may be stored in a memory within the IM portal that can be later retrieved by, for example, a location management server, such as location management server 330 of FIG. 3.

Location information for subscribers of the location-aware IM service may be provided in response to a variety of events. For example, in one implementation, a subscriber's location information may be updated automatically as part of a login process to the IM service. The subscriber may select, for example, an "update location at login" check box which can be made available to the subscriber during initial setup of the IM service and/or in a location opt in/out menu after login. In another implementation (if a subscriber has opted into sharing their location with the IM service at some level), the subscriber may be able to request a real-time update of their current location. This request can initiate action for the subscriber's device to gather current location information and update both the subscriber's device and the IM portal. Subscriber-initiated updates may be available to the subscriber via, for example, an "update my location now" option. This option can be used to update the requestor's location and to refresh a requestor's smart groups (which are described below). In another implementation, a subscriber may be allowed to manually set their location, and/or may be required to enter a physical address. The subscriber's location may remain as the manually-entered location until the subscriber logs off the location-aware IM service, logs on to the location-aware IM service from a device with a fixed location (e.g., a desktop computer), changes the manually-set location, performs a subscriber-initiated update, or the location information expires (e.g., a subscriber may set a time limit for a manually-set location). If the subscriber enters a location that does not physically exist and the subscriber has entered parts of a physical address, then the IM portal may set the subscriber's location using the closest accurate information based on what the subscriber has provided (e.g. a city/state, a city, a zip code region, etc).

Still referring to FIG. 5, the requesters' location information with random error information may be received (block 520). For example, an IM gateway from a carrier network, such as IM gateway 150, may send a requestor's mobile location information that has been adjusted with random error information to an IM portal, such as IM portal 140, where the location information may be received. The requestor's location information may be used to respond to a location request that may accompany the location information. However, the requestor's location information may also be stored in a memory within the IM portal and may be retrieved for use in responding to future location requests by, for example, a location management server, such as location management server 330 of FIG. 3.

A location request for nearby friends may be received (block 530). For example, an IM gateway from a carrier network, such as IM gateway 150, may send a request to locate nearby friends to an IM portal, such as IM portal 140, where the request may be received. The location request may be included together with the requestor's mobile location information that has been adjusted with random error information. In one implementation, the location request may include a parameter defining the area for which the requestor's friends should be searched (such a particular radius from the present location of the requester). In another implementation, the requestor's parameters for a location request may be provided to the IM portal and stored prior to the actual request.

Relative distances of friends' locations with random error information may be computed (block 540). For example, components in the IM portal may relate the requestor's location information with the available location information of IM friends of the requestor. For those subscribers on a requestor's friends list who have authorized that their location information be made available to the requester, components in the IM portal may identify those within the radius parameter of the requestor.

A list of nearby friends with location and/or a map data may be generated (block 550). For example, IM portal may identify, in a list, one or more of the requestor's IM friends having a location within the radius parameter provided. In one implementation, each friend may be included in the list with, for example, an address or description of the location of record. In another implementation, a graphical map of the requestor's region of interest may be generated, with the location of each friend overlaid on the map. This graphical map (a "friend map") may be used to display a current location of the requestor and nearby vicinities. The friend map may also display general locations of the requestor's friends within a specified range.

The location and/or a map data may be sent to the carrier network (block 560). For example, the IM portal may send the list of nearby friends and/or a map showing the friends' approximate location to an IM gateway of the carrier network (such as, for example IM gateway 150) for eventual delivery to the requestor.

Figure 6:
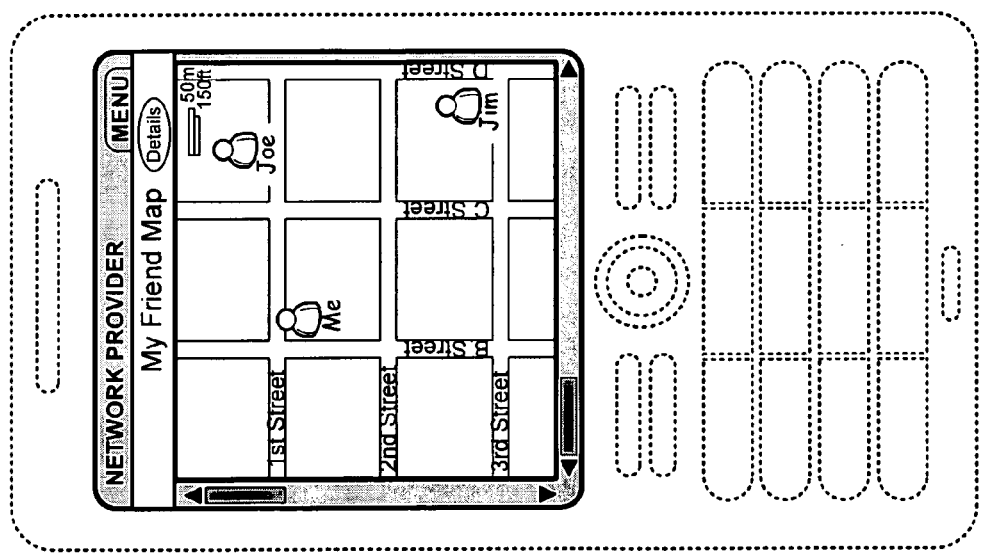
FIG. 6 is an exemplary graphical map shown on the display of a mobile device.

FIG. 6 provides an exemplary graphical map shown on a display of a mobile device. If multiple friends are near a specific area on the map, the IM service provider may group the friends together in one visual icon. Additional information can be provided about the friends on the map if the requestor selects to view details using, for example, a soft key on the display of the requestor's device.

In one implementation, the IM service provider may make available a "get map" application programming interface (API) where the requestor's device can specify a number of feet or miles that represents a width or height of the map and a Boolean flag that would cause a map with at least one friend to be populated on the map. In the event that no friends are found within the radius parameter, the IM portal may generate a list or map including the closest of the requestor's friends and may indicate in the map or list that the scale of the search has been modified because no friends were found within the radius parameter. For example, the request may return at least one friend whenever the Boolean flag has been set. For example, if the requestor's device requests "500" meters for the map range, but there is no friend within that range, the IM portal can send a zoomed out map to the point that at least at least one friend is displayed in the map. The dimensions of the zoomed out map may be represented to the requestor in some visual format, such as a scale indicator on the map. The image sent to the requestor's device may be greater in size than the actual screen dimension as to allow horizontal and/or vertical scrolling. A "friend details" screen (available via a soft-key) may display the relative estimated distance between the requestor and a particular friend.

In another implementation, the subscriber may be able to view their current location using the IM interface on the subscriber's device. This location information can be reverse geo-coded, meaning it may display an address or a physical location name (e.g., "Metropolitan Grill," if the subscriber has manually updated the location of the Metropolitan Grill). Upon queries from other subscribers, the IM portal may return the physical location name as well as the physical location address at the same time.

In still another implementation, detailed subscriber location information can be available for subscribers near a particular requestor. A "find nearby friend" option may request that the requestor update his/her location information and may display a friend map to the requestor. The scale of the friend map may be a parameter set by the requestor which may be directly associated with the radius parameter for defining a "nearby friend" group. If there are no friends available in the initial map, the IM network servers may return an expanded map with at least one friend on the map, as long as the requestor has one friend with location information available and the requestor has set a Boolean flag that causes at least one friend to be returned on the map. When the requestor views the friend map, a soft-key selection may be available for "friend details" in which the subscriber can view the location information available from the IM service provider for the friend(s) being displayed on the friend map. Each friend's location may be displayed as "near<x location>" to inform the requestor that the location information may not be completely accurate.

Figure 7:
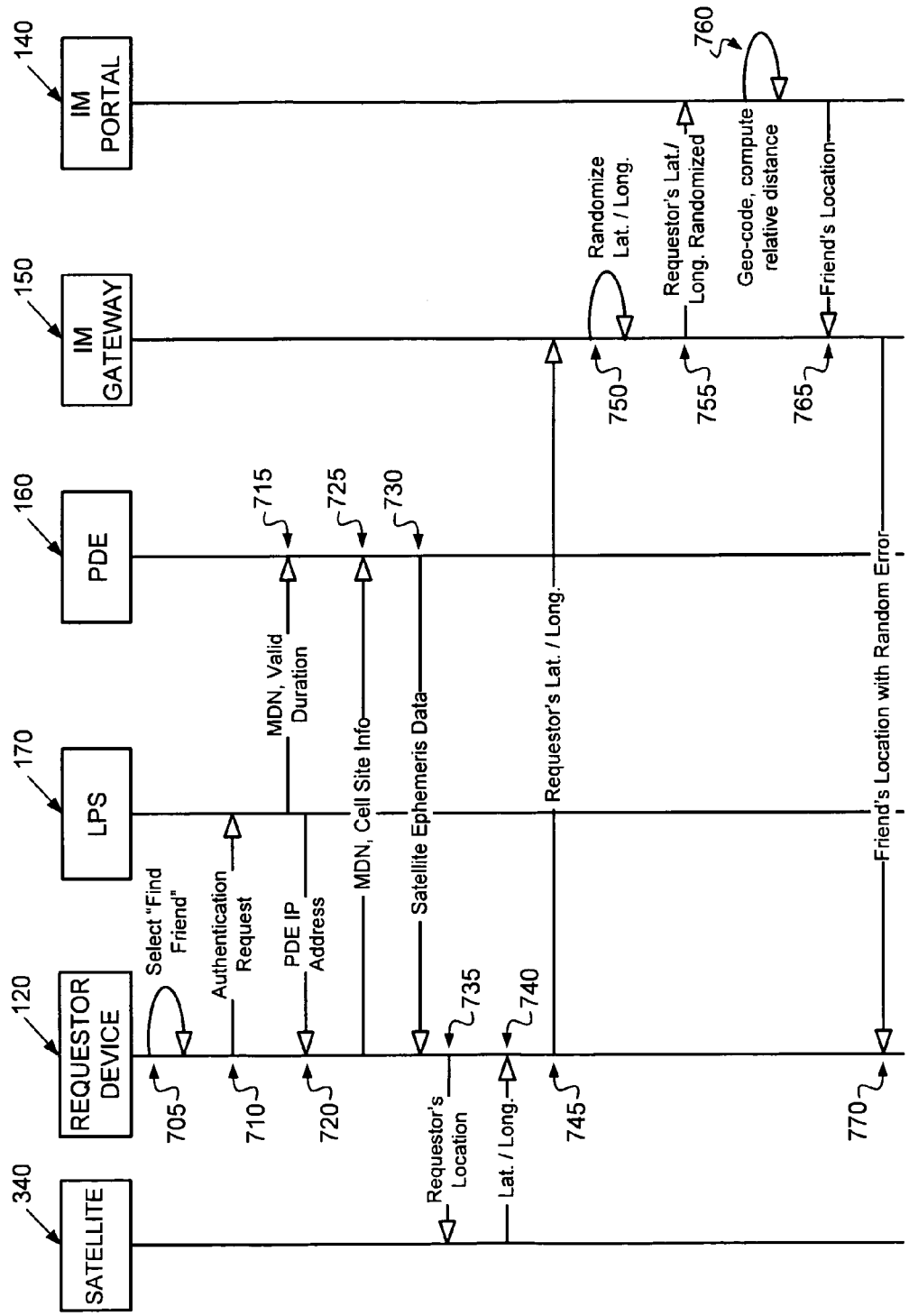
FIG. 7 is a process flow illustrating exemplary operations that may be performed by various components within a system offering location-aware IM service.

FIG. 7 provides a process flow illustrating exemplary operations that may be performed by various components within a system offering location-aware IM service when a request to locate an IM friend is placed. The process may begin when a requestor selects a "find nearby friend" feature from the IM software on the requestor's mobile device 120 (line 705). Parameters for a scope of what may constitute "nearby" may be the default parameters of the IM software or may have been previously set by the subscriber. For purposes of the present example, the subscriber may have selected a parameter of friends within a two-kilometer radius.

Requestor device 120 may send an authentication request to LPS 170 (line 710). LPS 170 may authenticate the request and may respond by providing two separate signals. LPS 170 may provide the mobile directory number (MDN) of requestor device 120 to PDE 160 with an indication of a valid duration of the requesting session (line 715). LPS 170 may also send a signal to requestor device 120 with the IP address of PDE 160 (line 720).

Requestor device 120 may send to PDE 160 (e.g., using the IP address provided from LPS 170) the cell site information to locate the general location of requestor device 120 (line 725). Based on the cell site information, PDE 160 may send requestor device 120 ephemeris data that can be used to locate appropriate satellites for global positioning (line 730). Requestor device 120 may send a signal to satellite(s) 340 to request position information (line 735). Satellite(s) 340 may respond to the signal by providing latitude and longitude coordinates indicating the position of requestor device 120 (line 740). The latitude and longitude coordinates of requestor device 120 may be sent to IM gateway 150 (line 745). The IM gateway 150 may receive the latitude and longitude coordinates of requesting device 120 and may add a random error (line 750). The introduction of random error to the coordinates may make it difficult for individuals with malicious intent to locate the exact location of requestor device 120 because a third party can never be absolutely certain what "error" has been introduced.

IM gateway 150 may send the randomly-altered latitude and longitude coordinates of requesting device 120 to the IM portal 140 (line 755). IM portal 140 may have stored location data about other subscribers. IM portal 140 may query its infrastructure (e.g., location management servers 330) to identify the location of any friends that may be associated with requestor device 120. Friends' location data may include, for example, randomized coordinates from a mobile device, locations associated with a fixed IP address, manually entered locations, and other location data. Assuming that the requestor had been granted permission by one or more friends to see their location information, IM portal 140 may identify the location and identity of any friends within a two-kilometer radius of the randomly-altered latitude and longitude coordinates of requestor device 120 (i.e., "nearby friends") (line 760). The nearby friend information may be sent to IM portal 150 (line 765) and then passed on to requestor device 120 (line 770).

Methods and systems described herein may provide the capability of receiving, at a carrier network provider, a request from a requestor's mobile device to locate an instant messaging (IM) friend from the requestor's IM friends list. The carrier network provider may authenticate the request for use of location-based services on the carrier network and provide information to assist the requestor's mobile device in identifying its location. The carrier network may receive geographic location coordinates from the requestor's mobile device and may add random error information to the geographic location coordinates before sending the request to locate an IM friend and the geographic location coordinates with random error to an IM portal. After processing through the IM portal, the carrier network may receive a list of the requestor's IM friends within a particular region near the geographic location coordinates with random error information, and may send to the requestor's mobile device the list of IM friends within the particular region near the geographic location coordinates with random error.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while random error information has been shown to be introduced to a requestor's location prior to being sent to an IM portal, in other implementations, random error may be introduced to the latitude and longitude coordinates of nearby friends after the true coordinates have been used to locate friends within the parameters of the requestor.

As an additional example of a variation, in one implementation, dynamic friend groups (or "smart groups") may be defined in which a subscriber can customize the parameters that determine specific friends that should be listed under that group at the time the parameter is set. Smart groups can be set up as a geo-fence to a specific location. For example, any subscriber within five kilometers or miles of a requestor's current location could be a parameter for a particular smart group. There may be a maximum distance for the smart group parameter (e.g., 100 kilometers), and this maximum can be consistent with the maximum zoom-out distance for the friend map (if zoom capabilities are available). Subscribers may be presented with a limited number of valid distances to select for the smart group parameter (e.g., 1, 5, 20 or 100 kilometers). A default smart group, for example, may use one kilometer as the parameter for "nearby friends." Criteria for the default smart group and the friend map may be mapped together so that, for example, when the subscriber sees a friend listed in the default smart group, the friend will also appear on the friend map. The radius parameter may be unique to a screen name and may be a parameter stored by the IM service provider to allow for a subscriber to log in from different devices (e.g., desktop or mobile) and still maintain a persistent "nearby friends" distance. A subscriber may use a smart group, for example, to easily send an instant message to an entire group (e.g., a multicast) or to easily select IM recipients from the smart group.

As another example, a subscriber of location-aware IM service may be able to manage privacy controls from either a device with a fixed location or a mobile device. A subscriber may be able to dynamically turn on/off sharing location-awareness completely. Alternatively, the subscriber may control which groups may share location information (e.g., friends only/myself/specific contacts) and may allow/deny specific subscribers/groups to view the subscriber's location. The subscriber may be able to set up, for example, quiet hours (e.g., disabling the location-awareness feature) specific to all friends or individual friends. The subscriber's device may send these settings to the IM service provider, and the settings can be stored by the IM service provider along with other privacy preferences. The privacy settings for a subscriber may be stored by the IM service provider and may be provided to a mobile device (via a gateway) during the subscriber's login. The privacy settings may also be modified by a subscriber from a mobile device while logged in to the location-aware IM service.

As still another example, awareness of a subscriber's mobile location may be an opt-in solution. In one implementation, upon first login to the location-aware IM service, the subscriber can be prompted to opt-in to setting up their privacy controls. The subscriber may have the options of, for example, "yes/no/don't ask again" in response to the request to opt in. The subscriber may also have the ability to opt-out/opt-in to sharing location information after the subscriber has completed the login to the location-aware IM service. Opting out may override any existing privacy settings and can temporarily disable location sharing with any other subscriber regardless of whether a subscriber's automatic location updates are activated.

As yet another example, the location-aware IM service may provide a subscriber with the ability to send invitations to their friends to share their location with the subscriber. The subscriber can make the request using at least two different scenarios: by a bulk request during privacy setup or by individual requests to particular friends on a subscriber's friends list. When the subscriber sets up privacy for the location-aware IM service, the subscriber's device can check with the IM service provider to see with which of the friends the subscriber has opted to share his/her location (during a specific instance). If the subscriber's device discovers that some of these friends are not sharing location awareness with the subscriber, then the subscriber's device may prompt the subscriber if they would like to ask these friends to share location with the subscriber. Requests may not be sent for friends that the subscriber has already granted location awareness for during a previous configuration attempt. After initial setup, the subscriber can select individual friends and request an invitation to be sent to the individual friend to share locations with them. For example, if subscriber A initiates a request to subscriber B, then subscriber B receives the option to (1) add subscriber A to the friends list and grant permission to share subscriber B's location (and, optionally, add subscriber A to subscriber B's friends list only if subscriber A is not already on subscriber B's friends list), (2) deny the request, and (3) block subscriber A. When subscriber B is blocked by subscriber A, subscriber B may no longer be able to view subscriber A's location (including existing location) until subscriber A unblocks subscriber B. Subscriber B may also be given the option to learn more about what location sharing means, the ways in which they can share location, and how they can download specific software.

As a further example, a subscriber's friends list may include a visual identification that makes it easy for the subscriber to see who they are sharing location with as well as who is sharing location with them. The subscriber's device may also be able to determine, for example, that a friend is in "quiet hours" status and display that state to the subscriber. For example, a single arrow in one direction (e.g., →) next to a presence icon for a particular friend on the subscriber's friends list could represent location being shared by the subscriber but not by the friend; a single arrow in the opposite direction (e.g., ←) could represent location being shared by the friend but not the subscriber, and a double arrow (e.g., ← →) could represent location being shared both ways. The IM service provider may allow asynchronous update capabilities that allow the subscriber's device to determine which friends are currently sharing location with the subscriber.

Also, while series of blocks have been described with regard to the flowcharts of FIGS. 4, 5 and 7, the order of the blocks may differ in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by one or more servers, a request from a requestor mobile device to locate each instant messaging (IM) friend device from an IM friends list associated with the requestor mobile device;
    authenticating, by the one or more servers, the request for use of location-based services;
    receiving, by the one or more servers, geographic location coordinates from the requestor mobile device;
    adding, by the one or more servers, random error coordinate information to the geographic location coordinates, adding the random error coordinate information including altering the geographic location coordinates, based on an algorithm, to include an error vector comprising a sum of random error vectors associated with particular geographical points to determine a geographic location point of the requestor mobile device at the time of the request,
        the geographic location point of the requestor mobile device being independent of a geographic location point of each IM friend device;
    sending, by the one or more servers, the request to locate each IM friend device and the geographic location coordinates with the random error coordinate information;
    determining, by the one or more servers, the geographic location point of each IM friend device by adding other random error coordinate information to geographic location coordinates of each IM friend device, adding the other random error coordinate information including altering the geographic location coordinates of each IM friend device, based on the algorithm, to include another error vector comprising a sum of random error vectors associated with particular geographical points of each requested IM friend device,
        the geographic location point of each IM friend device being independent of the geographic location point of the requestor mobile device;
    generating, by the one or more servers and based on the location of the requestor mobile device and the geographic location point of each IM friend device, a list of IM friend devices associated with the requestor mobile device, at the time of the request from the requestor mobile device, within a particular region; and
    sending, by the one or more servers and to the requestor mobile device, the list of IM friend devices within the particular region near the geographic location coordinates with the random error coordinate information.

2. The method of claim 1, further comprising:
    receiving cell site information from the requestor mobile device; and
    sending ephemeris data to the requestor mobile device based on the cell site information.

3. The method of claim 1, where an IM portal stores location-based data associated with at least one of the requestor mobile device or each IM friend device.

4. The method of claim 1, where adding the random error coordinate information includes altering the geographic location coordinates to a default coordinate within a defined region based on a configurable maximum error limit.

5. The method of claim 1, where the particular region encompasses a radius from the location of the requestor mobile device that is selected by a requestor.

6. The method of claim 1, where the requestor mobile device defines a sub-group of IM friends based on the list of IM friend devices within the particular region near the geographic location coordinates with the random error coordinate information.

7. A device comprising:
    a processor to
        receive, from a requestor mobile device, a request to locate each instant messaging (IM) friend device from an IM friends list associated with the requestor mobile device,
        receive geographic location coordinates from the requestor mobile device,
        determine, at the time of the request, a geographic location point of the requestor mobile device, the geographic location point of the requestor mobile device being independent of a geographic location point of each IM friend device, by adding random error coordinate information to the geographic location coordinates, adding the random error coordinate information including altering the geographic location coordinates, based on an algorithm, to include an error vector comprising a sum of random error vectors associated with particular geographical points,
        determine, at the time of the request from the requestor mobile device, the geographic location point of each IM friend device, the geographic location point of each requested IM friend device being independent of the geographic location point of the requestor mobile device, by adding other random error coordinate information to geographic location coordinates of each IM friend device, adding the other random error coordinate information including altering the geographic location coordinates of each IM friend device, based on the algorithm, to include another error vector comprising a sum of random error vectors associated with particular geographical points of each IM friend device, and generate, based on the geographic location point of the requestor mobile device and the geographic location point of each requested IM friend device, a list of IM friend devices within a particular region within a particular distance from the geographic location coordinates with the random error coordinate information.

8. The device of claim 7, further comprising:

a location proxy server to authenticate a request for use of location-based services from the requestor mobile device; and a position determining entity to receive cell site information from the requestor mobile device and send ephemeris data to the requestor mobile device based on the cell site information.

9. The device of claim 7, where an IM portal stores location-based data for each IM friend device.

10. The device of claim 7, where the random error coordinate information includes a configurable maximum error limit.

11. The device of claim 7, where the particular region includes a radius from the location of the requestor mobile device that is selected by a requestor.

12. The device of claim 7, where the list of IM friend devices within the particular region includes a map of a region that includes indications of a location of each IM friend device in the particular region.

13. The device of claim 7, where the requestor mobile device defines a sub-group of IM friends based on the list of IM friend devices within the particular region near the geographic location coordinates with the random error coordinate information.

14. A non-transitory computer-readable medium storing instructions, the instructions comprising:

one or more instructions which, when executed by at least one processor, cause the at least one processor to:

receive a request from a requestor mobile device to locate each instant messaging (IM) friend device from an IM friends list associated with the requestor mobile device;

send data to the requestor mobile device based on cell site information from the requestor mobile device;

receive geographic location coordinates from the requestor mobile device;

determine, at the time of the request, a geographic location point of the requestor mobile device, the geographic location point of the requestor mobile device being independent of a geographic location point of each IM friend device, by adding random error coordinate information to the geographic location coordinates, adding the random error coordinate information including altering the geographic location coordinates, based on an algorithm, to include an error vector comprising a sum of random error vectors associated with particular geographical points;

receive, at the time of the request from the requestor mobile device, a geographic location point of each IM friend device, the geographic location point of each IM friend device being independent of the geographic location point of the requestor mobile device, determined by adding other random error coordinate information to geographic location coordinates of each IM friend device, adding the other random error coordinate information including altering the geographic location coordinates of each requested IM friend device, based on the algorithm, to include another error vector comprising a sum of random error vectors associated with particular geographical points of each IM friend device;

generate, based on the geographic location point of the requestor mobile device and the geographic location point of each IM friend device a list of IM friends, associated with the requestor mobile device within a particular region near the geographic location coordinates with the random error coordinate information; and send to the requestor mobile device the list of IM friend devices within the particular region near the geographic location coordinates with the random error coordinate information.

15. The medium of claim 14, further comprising:

one or more instructions to authenticate the request for use of location-based services.

16. The medium of claim 14, where the particular region encompasses a radius from the location of the requestor mobile device that is selected by a requestor.

17. The medium of claim 14, where the list of IM friend devices within the particular region includes a map of a region that includes indications of a location of each IM friend device in the particular region.

18. A system comprising:

one or more devices to:

receive a request from a requestor mobile device to locate each instant messaging (IM) friend device within a particular range of the mobile device;

receive geographic coordinates from the requestor mobile device;

determine, at the time of the request, a geographic location point of the requestor mobile device, the geographic location point of the requestor mobile device being independent of a geographic location point of each IM friend device, by adding random error coordinate information to the geographic coordinates, based on an algorithm, to include an error vector comprising a sum of random error vectors associated with particular geographical points;

determine, at the time of the request from the requestor mobile device, the geographic location point of each IM friend device, the geographic location point of each IM friend device being independent of the geographic location point of the requestor mobile device, by adding other random error coordinate information to geographic location coordinates of each IM friend device, adding the other random error coordinate information including altering the geographic location coordinates of each IM friend device, based on the algorithm, to include another error vector comprising a sum of random error vectors associated with particular geographical points of each IM friend device;

generate, based on the geographic location point of the requestor mobile device and the geographic location point of each IM friend device, a list of IM friend devices within the particular range of the requestor mobile device based on the geographic coordinates with the random error coordinate information; and send to the requestor mobile device the list of IM friend devices within the particular range.

19. The system of claim 18, where the one or more devices are further to:
- authenticate the request from the requestor mobile device to locate each IM friend device within a particular range of the requestor mobile device;
- receive cell site information from the requestor mobile device; and
- send data to the requestor mobile device based on the cell site information.

20. The system of claim 18, where the list of IM friend devices within the particular region includes a map of a region that includes indications of a location of each IM friend device in the particular region.

* * * * *